May 28, 1929.  A. L. PUTNAM  1,714,622
PNEUMATIC TREADED VEHICLE WHEEL
Filed Feb. 11, 1924   2 Sheets-Sheet 1

Inventor
Alden L. Putnam

By Whittemore Hulbert Whittemore
+Belknap   Attorneys

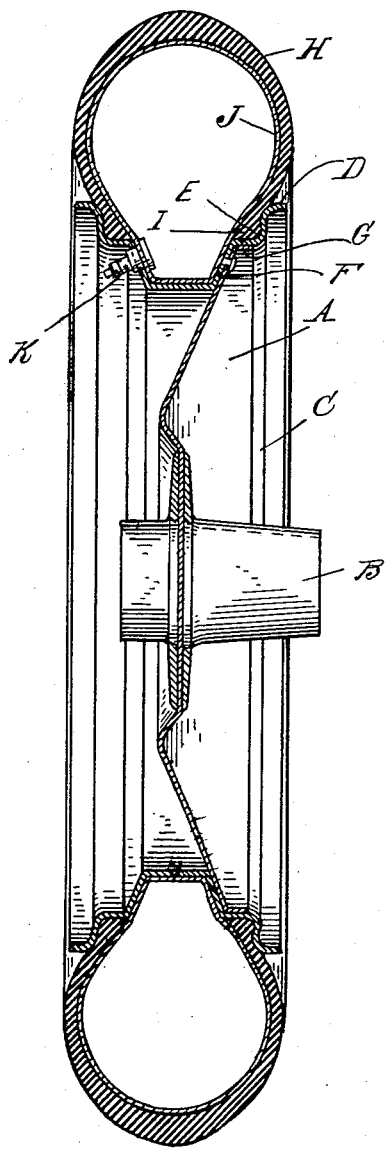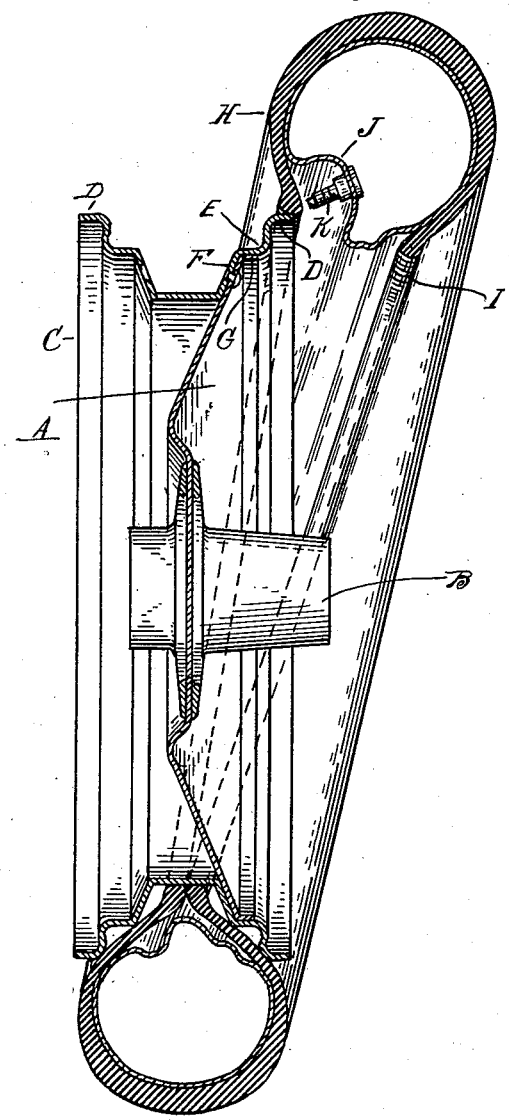

Patented May 28, 1929.

1,714,622

UNITED STATES PATENT OFFICE.

ALDEN L. PUTNAM, OF LANSING, MICHIGAN, ASSIGNOR, BY MESNE ASSIGNMENTS, TO STEEL WHEEL CORPORATION, OF LANSING, MICHIGAN, A CORPORATION OF MICHIGAN.

PNEUMATIC-TREADED VEHICLE WHEEL.

Application filed February 11, 1924. Serial No. 692,116.

The invention relates more particularly to that type of pneumatic treaded vehicle wheels in which the cross-sectional area of the tire is relatively large with respect to standard practice for wheels of the same tread diameter. It is the object of the invention to facilitate the mounting of such large tires upon their rims and to also obtain an exceedingly simple construction of demountable wheel. To this end the invention consists in the construction as hereinafter set forth.

In the drawings:

Figure 2 is a cross-section of the wheel with the tire in place; and

Figure 3 is a similar view showing the position of the tire during engagement.

Figure 1:
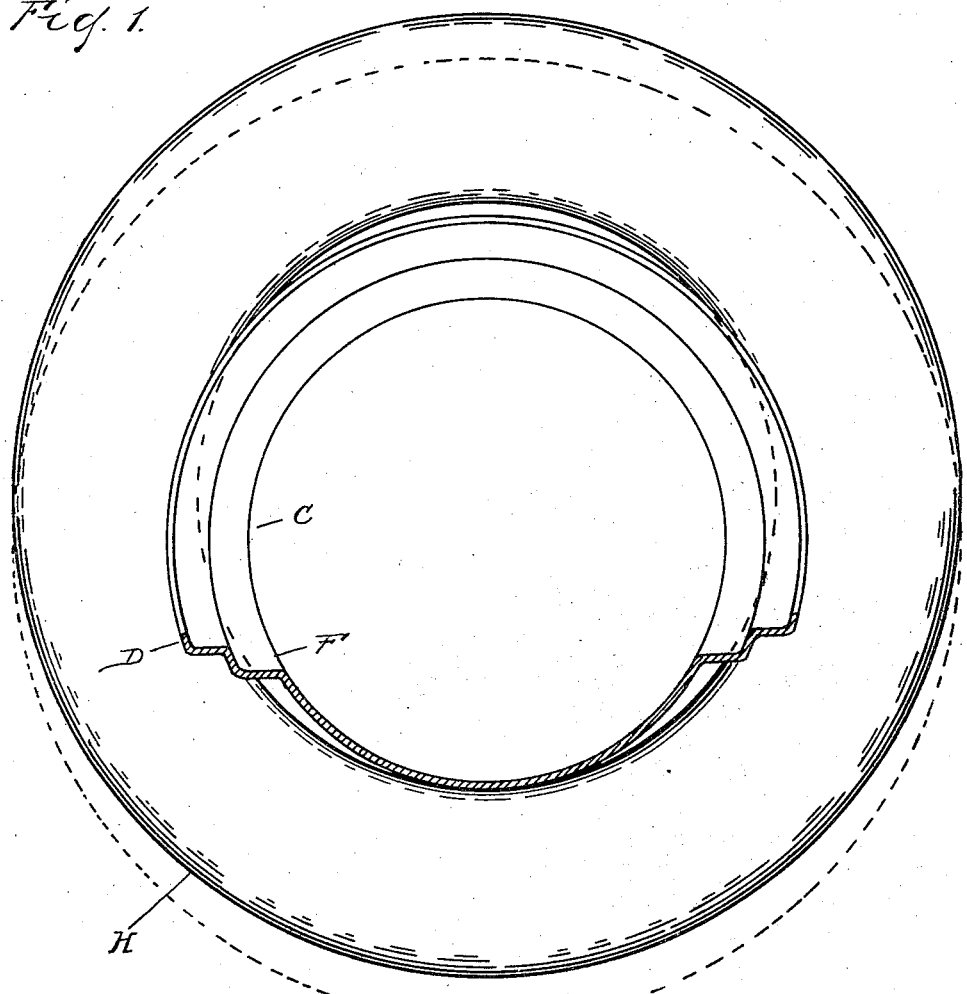
Figure 1 is a sectional elevation through the wheel.

My improved wheel comprises a dished disk body A adapted for demountable engagement with a hub B of any suitable construction. C is a tire engaging rim provided with side flanges D, bead engaging seats E adjacent thereto and a radially inwardly extending channel portion F. This portion F is tapered and the taper is preferably the same as the inclination of the dished disk, so that the disk will fit against one side thereof. The two members are secured to each other by riveting or other suitable securing means and the disk is preferably provided with a cylindrical flange portion G, which fits beneath one of the bead portions E and forms a pilot for centering the rim and holding the same circular.

The tire case H is provided with beads I which are adapted to normally seat upon the bead seats E, but which may be initially inserted in the inwardly extending channel portion F. By thus inserting the beads on one side of the case it is possible to slip the remainder of the case over the flanges D. This is for the reason that the circumferential length of the bead will be greater than that of the segment of the flange over which the case must be forced plus the distance between the ends of said segment through the channel portion.

In operation, to place the tire upon the rim the inner tube J is placed in the case in the usual manner and the valve stem K is inserted through a suitable aperture in the rim. As shown, this aperture is arranged on the outside of the wheel so that the stem is readily accessible for inflation of the tire. As has been stated the portion of the case which is first engaged with the rim has the beads I pressed together sufficiently to enter the channel portion F, after which the remaining portion of the bead may be slipped over the flange of the rim into engagement with the seat portion E. The inner tube is then inflated, which will force outward the portion of the case initially in the channel F until the beads thereof also engage the ledge or bead seat E.

The construction as described is particularly advantageous in connection with tires of large cross sectional area and correspondingly low inflation pressure. Such tires are necessarily of considerably greater width than tires of standard size and must be carried by correspondingly wider rims. Therefore, it becomes difficult to mount or demount tires of this character in connection with the usual types of construction of rim.

What I claim as my invention is:

In a wheel, the combination with a disk having a laterally turned peripheral edge, of a tire carrying rim having an inwardly projecting base portion and a laterally extending portion, the angled edge of the disk seating in the angled portion of the rim and means for uniting the rim and disk.

In testimony whereof I affix my signature.

ALDEN L. PUTNAM.